(No Model.)
W. M. NORCROSS.
GOVERNOR.
No. 337,514.
Patented Mar. 9, 1886.
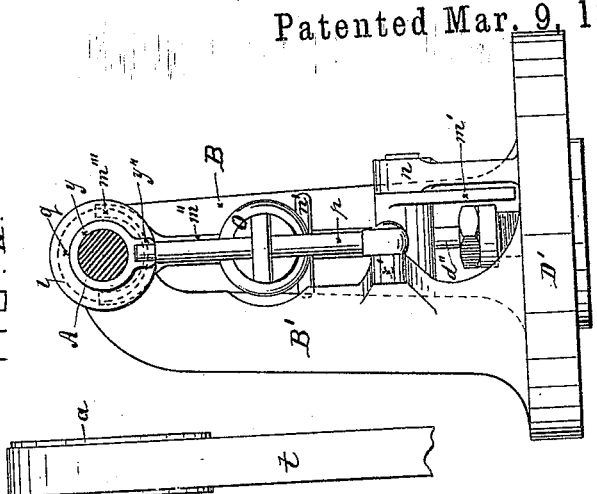
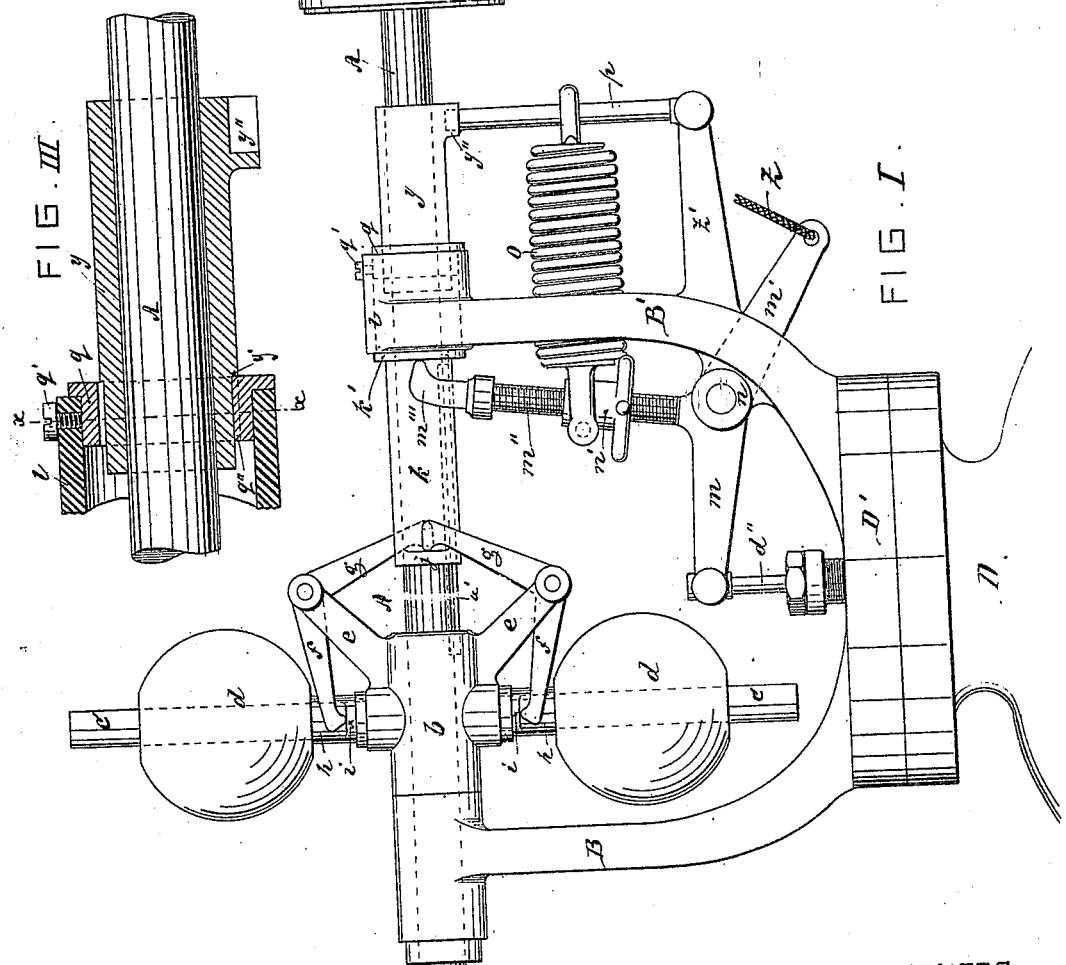
WITNESSES
Wm A Lowe
Thomas Turner
INVENTOR
William M Norcross
per Roeder & Bruisu
Attorneys

United States Patent Office.

WILLIAM M. NORCROSS, OF BROOKLYN, NEW YORK.

GOVERNOR.

SPECIFICATION forming part of Letters Patent No. 337,514, dated March 9, 1886.

Application filed August 6, 1885. Serial No. 173,087. (No model.)

*To all whom it may concern:*

Be it known that I, WILLIAM M. NORCROSS, of the city of Brooklyn, county of Kings, and State of New York, have invented a new and Improved Governor, of which the following specification is a full, clear, and exact description.

This invention relates to a governor; and it consists in the various features of improvement hereinafter more fully pointed out.

In the accompanying drawings, Figure 1 is a front view of my improved governor, and Fig. 2 is an end view of the same. Fig. 3 is a longitudinal section, and Fig. 4 a cross-section on line $x$ $x$, Fig. 3, of the inner bearing of the governor-shaft on an enlarged scale.

The letter A represents the governor-shaft rotated from pulley $a$. Upon shaft A is firmly attached a sleeve or collar, $b$, provided with the radially-projecting arms $c$ $c$, upon which the sliding balls $d$ $d$ are mounted. $e$ $e$ are a second pair of arms projecting from collar $b$, and serving as supports for the bell-cranks $f$ $g$, to which they are pivotally attached. The arms $f$ of the bell-cranks are forked and straddle a tubular extension, $h$, of each ball $d$, resting with their hooked ends upon a shoulder, $i$, formed on extension $h$. The arms $g$ of the bell-cranks extend, respectively, to the right and left of shaft A and engage with lugs $j$, cast upon a sliding tube, $k$, slipped over shaft A and working on a feather, $a'$, attached to the same.

B B' are brackets cast upon the cover D' of the throttle-valve D. The bracket B supports the outer end of the shaft A, and the bracket B' receives the sleeve $y$ for supporting the inner end of said shaft A, the construction of which will be more fully described hereinafter.

To the bracket B' a bearing, $n$, is secured, to support a three-armed lever, $m$ $m'$ $m''$. The arm $m$ of this lever is connected with the stem $d''$ of the valve, while the arm $m'$ is provided with a hand-rope, $z$, that enables the engineer to adjust the steam-supply. The upwardly-projecting arm $m''$ has a hook-shaped end, $m''''$, that bears against a flange, $k'$, at the end of tube $k$. The arm $m''$ is screw-threaded around its circumference, and is embraced by a hand-nut, $n'$, which may be moved up and down to any desired extent. To the hand-nut $n'$ is attached one end of a spiral spring, $o$, the other end of which is secured to and capable of sliding on an upright support, $p$.

It will be seen that as the nut $n'$ is screwed upward—viz., away from the pivotal connection of arm $m''$—it carries the spring $o$ with it, and thus the power necessary for oscillating said arm against the action of the spring is increased. On the other hand such power is diminished on screwing the nut $n'$ down.

The operation of the parts as thus far described is as follows: The nut $n'$ being properly adjusted, the shaft A is rotated. The centrifugal force will force the balls $d$ outward, as customary, in proportion to the rapidity of the rotation. The balls $d$ will cause the bell-cranks $f$ $g$ to turn on their pivots, and the arms $g$ will draw the tube $k$ inward—viz., toward the balls. The flange $k'$, against which the forked ends $m''''$ of the arm $m''$ bear, will cause such arm to turn against the action of spring $o$, and thus partly close the throttle-valve.

In the boss $l$ of frame B' a ring, $q$, is fixed by means of a set-screw, $q'$. Through this ring $q$ a sleeve, $y$, is passed, forming a bearing for the outer end of the governor-shaft A. The ring $q$ has on its inner periphery one or more projections, $q''$, and the sleeve $y$ is made with a shoulder, $y'$, which bears against the projections $q''$, and thus prevents the sleeve $q$ from slipping inward. The outside diameter of the largest part of this sleeve $y$ must be of such dimensions that when its shoulder $y'$ is moved clear of the projections $q''$ in the inside of the ring $q$ said enlarged part of the sleeve $y$ will pass freely through the ring $q$. The rod $p$, to which the spring $o$ is attached, is hinged to a projecting arm, $z'$, of the frame B', and its upper end is fitted between lugs $y''$ provided on sleeve $y$. By this arrangement the sleeve $y$ will be prevented from turning by the action of the rod $p$, the lower end of which is pivoted to the projecting arm $z'$, and at the same time when shoulder $y'$ of the sleeve $y$ bears against the projections $q''$, so as to hold the said sleeve $y$ in a proper position, this rod $p$ will be rigidly secured to form a firm support for the end of the spring $o$. The projection $q''$ on the inside of the ring $q$ must always be placed on the line of strain of the driving-belt $t$, and the natural spring of shaft A toward the belt $t$ will keep the shoulder $y'$ in line with projections $q''$ during the ordinary operation of the governor.

In case the belt should break, the shaft will naturally spring back, and thereby bring the shoulder $y'$ clear of the projections $q''$. This permits the sleeve $y$ to pass through the ring $q$, and thus the support $p$ of the spring $o$ is released and the arm $m''$ is permitted to move inward, thereby closing the valve, forming thus an automatic disengaging arrangement.

I claim as my invention—

1. The combination of shaft A and collar $b$, having arms $c\ e$, with balls $d$, and with bell-cranks pivoted to arms $c$ and imparting motion to sliding tube $k$, for operating the throttle-valve, substantially as specified.

2. The combination of a governor with a three-armed lever, $m\ m'\ m''$, of which arm $m$ is connected to the valve-stem, arm $m'$ is connected to a hand-rope, and arm $m''$ is oscillated by the action of the balls, substantially as specified.

3. The combination of lever $m\ m''$ with tube $k$, nut $n'$, embracing arm $m''$, and with the spring $o$, attached to nut $n'$, substantially as specified.

4. The combination of shaft A with collar $b$, having arms $c\ e$, and with balls $d$, bell-cranks $f\ g$, tube $k$, having lugs $j$, and collar $k'$, and with elbow-lever $m\ m''$, substantially as specified.

5. The combination of shaft A with sleeve $y$, having shoulder $y'$, and with ring $q$, having projections $q''$, and with the rod $p$ and spring $o$, substantially as specified.

6. The combination of shaft A with sleeve $y$, ring $q$, rod $p$, spring $o$, nut $n'$, and lever $m\ m''$, substantially as and for the purpose specified.

WM. M. NORCROSS.

Witnesses:
HENRY E. ROEDER,
THOMAS TURNER.